No. 879,940. PATENTED FEB. 25, 1908.
W. H. BLOOD, JR.
GROUND CONNECTION CLAMP.
APPLICATION FILED MAR. 23, 1905.
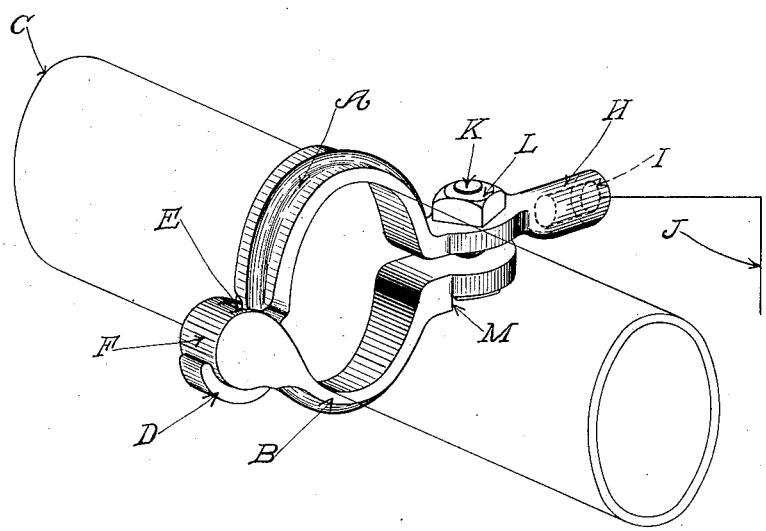
Witnesses:
J. Henry Parker
Robert Wallace.
Inventor:
William H. Blood, Jr.
by Macleod, Calver Cushman & Wiles
Attorneys.

UNITED STATES PATENT OFFICE.

WILLIAM H. BLOOD, JR., OF WELLESLEY, MASSACHUSETTS.

GROUND-CONNECTION CLAMP.

No. 879,940.     Specification of Letters Patent.     Patented Feb. 25, 1908.

Application filed March 23, 1905. Serial No. 251,572.

*To all whom it may concern:*

Be it known that I, WILLIAM H. BLOOD, Jr., citizen of the United States, residing at Wellesley, county of Norfolk, State of Massachusetts, have invented a certain new and useful Improvement in Ground-Connection Clamps, of which the following is a specification, reference being had therein to the accompanying drawings.

It is well known to those skilled in the art, that any break down between the primary and secondary circuits of an electric transformer may result in the diversion of a dangerous current to the secondary circuit, so that any person coming in contact with the circuit is in danger of serious injury, or even death. It is also well known that if the secondary circuit is properly grounded, this danger, resulting from a break down of the insulation, to persons coming in contact with the secondary circuit is largely or entirely overcome. Grounding is also advisable for parts of certain other systems not necessary to be mentioned here.

One method of grounding in use, particularly in buildings, is that of connecting the ground wire with water or gas pipes which are buried in the earth. The value of such grounding, it is evident, depends directly upon the quality of the connection made between the ground wire and the pipe. These ground connections when used for buildings are frequently placed upon the water or gas pipes in the cellar.

My invention has for its object to provide an improved ground connection clamp by means of which the ground wire may be connected electrically to the pipe in the best manner, so that the electrical continuity between the wire and the pipe shall be interrupted to the least possible degree. It is particularly adapted for use where protection from large currents of high potential is desired. Heretofore it has been common to make clamps for this purpose in two curved halves held together by a pair of bolts on opposite sides of the pipe, the said two halves clasping the pipe firmly. The ground wire is connected to one of the halves. Since the main body of the clamp is usually of brass and the bolts are of steel, it is found in practice that after the clamp has remained in the ground or in any damp place for a considerable length of time, the bolts rust to such an extent that the conductivity of the joints is materially lessened, and continued corrosion may even result in the insulation of one half from the other. Since the wire is connected to only one of these halves, it results, in the event of serious corrosion, that the effective area of contact between the clamp and the pipe after such corrosion has taken place, is one-half of what it was before.

My invention provides a form of clamp which may be made as cheaply, and applied as easily as heretofore, but which is not affected by corrosion, so that the effective area of contact to the pipe is never diminished.

My invention will be fully understood from the following description taken in connection with the accompanying drawings and the novel features thereof are pointed out and clearly defined in the claims at the close of this specification.

The drawing is a prospective view of my device embodying my invention.

Referring to the drawings, there is shown a ground connection clamp particularly adapted to be used where protection from large currents of high potential is desired. It is composed of two halves A and B which are shown in position about a pipe C, the pipe C being shown in outline as if it were transparent. The halves are curved to clasp and thus make electric connection with the pipe about substantially its entire circumference.

The upper half A is formed at D with a hook which passes through a slot E in the corresponding part of the lower half B, and engages the end portion F of the said lower half. There is thus formed a hook-joint which gives the two halves sufficient play with relation to each other to permit the clamp to be easily placed upon the pipe. I make the end F of the lower half B circular in cross-section and the inner surface of the hook D to correspond in shape therewith so that a contact of a sufficiently large area is made between the parts and the conductivity of the joint is thus at least as great as that of the remainder of the clamp. Contact is also made to some extent by the sides of the hook D with the walls of the slot E thus adding materially to the conductivity of the joint. The upper half A is formed with an extension H which is drilled, as shown at I for the reception of the ground wire J. The lower half B is extended beyond its curved portion only far enough to provide a proper seat for the head of the clamping bolt K which is provided with a nut L. I also form upon the lower half B, a shoulder M against which the head of the clamping bolt may rest and which prevents the said head from turning the nut L. The clamping bolt K may be made of steel with entire safety, since the conductivity of the joint is so high that it is unnecessary to rely upon the bolt itself for the conduction of any part of the current.

In practice I make my improved ground connection clamp of brass or other suitable metal having the proper low resistance, and which is also sufficiently malleable so that when pressure is applied to the two halves A and B by the bolt K, the said two halves may seat themselves firmly upon the pipe C thereby making a good electrical contact and preventing the entrance of moisture between the clamp and the pipe. In practice I find it convenient to file or make bright the exterior surface of the pipe C at the point where the said clamp comes in contact with it, thereby insuring a better contact between the pipe and the clamp. If desired the clamp and pipe may be further united by the use of solder.

What I claim is;

A clamp for making electric connection between a ground wire and a pipe comprising two coöperating jaws having curved interior surfaces to fit the cross sectional contour of the pipe, one of said jaws being provided at one end with a hook having a curved inner face, and the other jaw being provided at one end with a bulbous extension having a slot with which said hook engages, the outer end of the slot being convexly curved to conform to the concavity of the hook, means for clamping together the other ends of said jaws and an electric connection for the ground wire.

In testimony whereof I affix my signature, in presence of two witnesses.

WILLIAM H. BLOOD, JR.

Witnesses:
K. J. SHERATON,
J. HENRY PARKER.